L. SHERWOOD.
Wheel Cultivator.
No. 45,758. Patented Jan. 3, 1865.
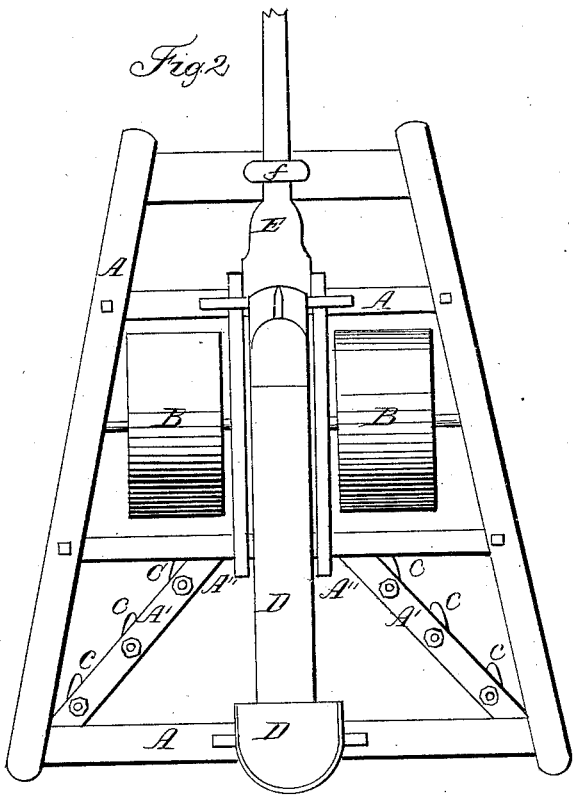
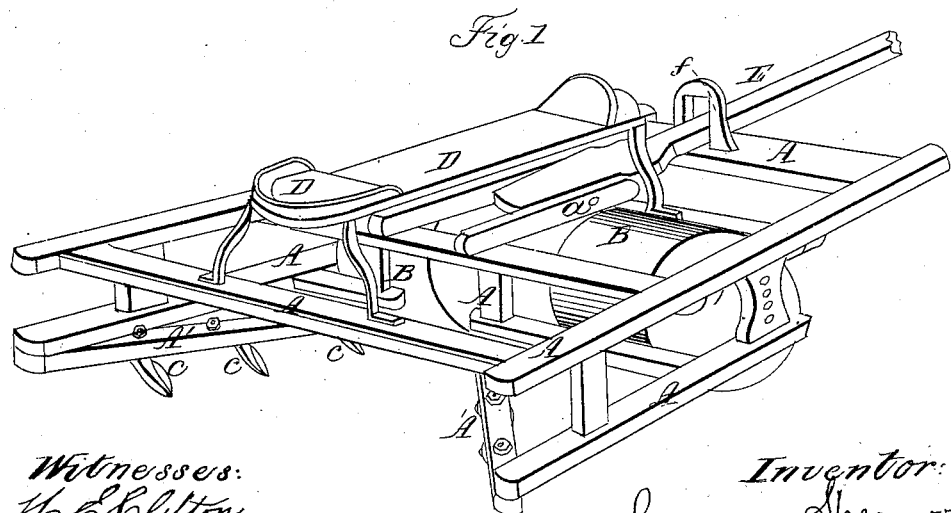
Witnesses:
H. E. Clifton
M. Randolph
Inventor:
Lyman Sherwood

UNITED STATES PATENT OFFICE.

LYMAN SHERWOOD, OF MARINE, ILLINOIS.

IMPROVEMENT IN CULTIVATORS.

Specification forming part of Letters Patent No. 45,758, dated January 3, 1865.

*To all whom it may concern:*

Be it known that I, LYMAN SHERWOOD, of Marine, in the county of Madison and State of Illinois, have invented a new and useful Improvement in Cultivators; and I do hereby declare that the following is a full and clear description thereof, reference being had to the accompanying drawings, and to the letters of reference marked thereon, and made to form a part of this specification.

The nature of this improvement relates to the peculiar arrangement of the cultivator-frame and its teeth or plows, in combination with two crushing wheels or rollers, and also to the arrangement of the pole with reference to said frame.

The invention herein described and represented is intended especially for the cultivation of corn in all its various stages of growth, so long as such cultivation may be necessary, and the same will be readily understood by reference to the accompanying drawings, of which—

Figure 1 is a perspective view, and Fig. 2 a top view or plan, of my improved cultivator.

A represents the cultivator-frame, which may be made somewhat wider at its rear than at its front end, and will be formed of width adapted to the suitable adjustment of devices for cultivating one row of corn with a single passage of the machine. Said frame K, near its center, is provided with two broad-banded rollers or wheels, B B, so arranged as to allow the proper space with reference to a row of corn between them. In the operation of the machine these rollers are adapted to crush all the clods between the rows of corn in front of the cultivator teeth or plows, and also to support the frame A when said teeth or plows may be thrown out of the ground. Attached to said frame A in such manner as to be easily removable and at the same time to form part and parcel thereof are two cultivator-bars, A' A', arranged to incline inwardly toward each other from the extreme rear end of the frame to their front points of attachment, A'' A'', and these points are upon lines nearly parallel with the inner faces of the rollers B B, thereby affording a space for a row of corn between the forward ends of the said bars. At suitable intervals to insure the proper cultivation or the hilling of the corn, as the case may be, the said bars A' A' are made to carry cultivator teeth or plows, as $c$ $c$.

Upon the frame A is arranged the driver's seat D.

Pivoted to the frame A, at $a$, is the pole E, which is made to pass through the standard $f$, where it will be allowed sufficient play to permit the proper vertical motion of the front end of the frame, by means of which the driver, by moving forward on his seat, may by his weight so tilt the frame as to throw the cultivator teeth or plows out of the ground, in which position the frame will be supported by the rollers B B, with a slight bearing, perhaps, upon the forward end of the pole as sustained by the draft-animals. By means of this arrangement of the pole the frame is rendered automatic in its action with reference to obstructions to its teeth or plows, inasmuch as any serious impediment to their progress has a tendency to tilt the forward end of the frame downward, and thereby release them from the ground. The said bars A' A' may be made adjustable in such manner as to carry their teeth or plows nearer to or farther from the corn, as may be desired, and they are made removable, in order that a frame carrying harrow-teeth may be substituted in their stead.

Having thus described my invention sufficiently to enable persons skilled in the art to which it appertains to make and use the same, what I claim as new, and desire to secure by Letters Patent, is—

1. The arrangement of the frame A A' A', with its teeth or plows $c$ $c$, in combination with the rollers B B, all being constructed and arranged to operate substantially as and for the purposes set forth.

2. The arrangement of the pole E, with reference to the frame A and standard $f$, substantially as and for the purposes set forth.

In testimony of which invention I have hereunto set my hand and seal.

LYMAN SHERWOOD. [L. S.]

In presence of—
H. E. CLIFTON,
M. RANDOLPH.